Feb. 2, 1960 R. W. KETCHLEDGE 2,923,475
SIGNAL COMPARISON SYSTEM
Filed April 10, 1957 2 Sheets-Sheet 1

EQUIV. EXCL. OR

AND

INVERTER

OR

INVENTOR
R. W. KETCHLEDGE
BY [signature]
ATTORNEY

Feb. 2, 1960 R. W. KETCHLEDGE 2,923,475

SIGNAL COMPARISON SYSTEM

Filed April 10, 1957

2 Sheets-Sheet 2

INVENTOR
R. W. KETCHLEDGE
BY [signature]
ATTORNEY

United States Patent Office 2,923,475

Patented Feb. 2, 1960

2,923,475

SIGNAL COMPARISON SYSTEM

Raymond W. Ketchledge, Whippany, N.J., assignor to Bell Telephone Laboratories, Incorporated, New York, N.Y., a corporation of New York Application April 10, 1957, Serial No. 651,897

22 Claims. (Cl. 235—175)

This invention relates to electrical signal comparison systems and more particularly to systems for comparing binary code signals.

The invention may be exemplified in its practical application in systems employing binary codes; that is, systems in which a code group consists of a numerical sequence of any number of 0's or 1's in any permutation arrangement. Therefore, any individual element of such a code consists of a 0 or 1. These 0 and 1 elements may be differentiated from each other in practical arrangements by conditions of current and no current, positive current and negative current, or by other pairs of suitable conditions.

In my application, Serial No. 581,175, filed April 27, 1956, a binary number comparison system is disclosed which provides an indication of the relative magnitudes or sign of the difference between two multidigit binary numbers. The instant invention indicates the exact magnitude of the difference between the two numbers as well as their relative magnitudes or sign.

The prior art discloses computing circuits capable of performing various mathematical functions with multidigit binary numbers such as addition and subtraction. In performing these functions such circuits operate initially on the least significant digit of each number and proceed digit-by-digit toward the most significant digits, after which the resultant is obtained. It is apparent that where speed is a critical factor, the delay inherent in completing this digit-by-digit comparison to achieve the desired result may render such circuits inadequate.

For example, high speed storage applications of cathode ray tubes depend upon rapid and accurate positioning of an electron beam in accordance with input information fed to the deflection circuitry of the tube in parallel binary form. In order to assure beam position accuracy, a monitoring system may be employed in accordance with that disclosed in the application of C. W. Hoover, Jr. and R. W. Ketchledge, Serial No. 581,073, filed April 27, 1956, now Patent No. 2,855,540. Output signals in parallel binary form are received from a monitor tube target indicative of the beam position. These signals are compared with the monitor input information signals, and resultant signals are fed to the tube's deflection circuitry to correct any errors in beam position. Direct analog subtraction as shown in the prior art would severely hinder the accuracy and speed of this operation.

The invention of my application Serial No. 581,175, filed April 27, 1956, may be utilized in the above example to perform the required comparison of two binary numbers and to provide an indication of the larger number so as to direct the deflection correction in the proper direction. By employing continuous feedback comparisons, correction signals may be provided until the difference between the input and output binary numbers is reduced to zero, thus assuring accurate beam positioning. The delay encountered in reaching the condition of equality by utilization of this system, however, necessarily curtails the speed of operation, and thus may prove inadequate in some extremely high speed applications.

The present invention, by indicating the exact magnitude of the difference between two multidigit binary numbers, as well as the relative magnitude or sign, obviates the plurality of comparisons required in comparison systems yielding relative magnitude or sign only, thus improving operating speed.

It is an object of this invention to provide a binary number comparison system.

It is another object of this invention to compare two binary numbers of the same order and to provide one of two output characteristics dependent upon the larger of the compared numbers and of a magnitude equal to the difference between the numbers.

It is another object of this invention to compare two binary numbers of different binary code forms so as to provide an indication of their relative magnitudes or sign and the exact difference in magnitudes.

The above objects are attained in accordance with an illustrative embodiment of the invention by the application to a comparator network of each of the various digits of a first binary number as one of two electrical signals, each digit being allotted a distinct input in one of several comparison positions of the comparator network. Each of the various digts of a second binary number to be compared with the first binary number is applied as one of two electrical signals to another input in the same position as the signal for the digit of corresponding significance in the former number all digits are applied at the respective inputs simultaneously. Thus the most significant digits in the compared binary numbers are applied simultaneously to one position of the comparator via separate leads, succeeding digits of lesser significance being applied to other positions thereof in similar fashion. The various positions are interconnected and also have individual outputs coupled to a common output which yields the relative magnitude or sign and the exact difference in magnitude of the compared binary numbers.

In the illustrative embodiment of this invention, each stage of the comparator comprises a series of logic circuits of the AND and OR variety. Logical AND circuits are variously known as gates or coincidence circuits and are employed generally throughout computer operation. Generally a logical AND circuit is a circuit having a plurality of inputs and a single output and is so designed that an output signal is obtained only when like signals of a predetermined type are received simultaneously on each of the inputs. A logical OR circuit is a circuit having a plurality of inputs and a single output and is designed to produce an output signal when signals of a predetermined type are received at one or more inputs.

A conventional subtractor circuit, as known in the art, proceeds in serial fashion to compare corresponding digits beginning with the least significant digits. The resultant is obtained only after all digit comparisons from least to most significant are completed in turn. For example, to subtract 75 from 123 in conventional fashion, the least significant digit (5) of the subtrahend is subtracted from the least significant digit (2) of the minuend, borrowing ten from the next more significant digit (2) of the minuend to provide a resultant of 8 for the least significant digit comparison. This resultant provides no indication of the sign or magnitude of the difference between the two numbers, which results are not obtained until the most significant digits have been compared. Similarly, a subtractor circuit as known in the art, operating on the same numbers in binary code form, proceeds through each digit comparison beginning with the least significant, and requires a finite delay in performing each digit comparison in turn.

In accordance with my invention, binary digit comparisons are conducted beginning with the most significant digits. Thus, for the above example the minuend 123=1111011 in conventional binary form,
the subtrahend 75=1001011 in conventional binary form, and the resultant 48=0110000 in conventional binary form.

The most significant digit is a 1 in both binary numbers, indicating merely that both seven digit binary numbers are between 64 and 127 inclusive. The next digit is a 1 in the minuend and a 0 in the subtrahend. This first most significant digit mismatch indicates that the minuend is larger than the subtrahend and that the minuend lies between 96 and 127 while the subtrahend lies between 64 and 95 and the resultant is between +32 and +63. Such information is adequate to indicate the approximate magnitude of the difference between the compared numbers as well as their relative magnitudes and forms the basis for my copending application, Serial No. 651,864. In accordance with my present invention I have found that the exact difference magnitude of two compared conventional binary code numbers can be derived from signals directed through a plurality of distinct binary weightings or analog values assigned to each digit position and corresponding to its binary significance. For example, in a seven digit binary number the digit positions are assigned binary weightings of 64, 32, 16, 8, 4, 2 and 1 in the respective order of significance. The occurrence of digit mismatches in the compared input digits determines which output weightings will be selected to receive comparison output signals and what proportion of the selected output weightings will be utilized to derive the desired exact magnitude output signal.

The exact magnitude system of this invention makes comparisons of corresponding digits in each number beginning with the most significant digits. The comparison circuit detects the digit position contributing the most to the difference indicated by the most significant digit mismatch and provides an output which is weighted in accordance with an analog weighting assigned the detected position. The circuit further detects each digit position contributing the most to the difference indicated by the first mismatch following a detected position and provides outputs having the assigned analog weightings of each such detected position. The polarity of each output signal is determined by the sense of the mismatch initiating the output, the analog equivalents of said outputs being added algebraically to obtain the final relative magnitude or sign and exact difference magnitude output of the circuit.

In accordance with the illustrative embodiment of this invention, the various comparisons leading to output signals may be categorized according to the following rules:

(1) If the digits match in the position immediately following the most significant digit mismatch or are mismatched in the same sense, provide a first output in accordance with the weighting assigned the most significant digit mismatch position.

(2) If the digits in the position or consecutive positions following the most significant digit mismatch are mismatched in opposite sense to that of the most significant mismatch digits, provide an output in accordance with the weighting assigned the last of such oppositely mismatched digit positions.

(3) Provide succeeding outputs in accordance with rules 1 and 2, substituting for the most significant digit mismatch the first mismatch following any position having an assigned weighting corresponding to that imparted to an output.

(4) Assign a polarity to each output in accordance with the sense of the mismatch initiating a comparison leading to an output, and add the outputs algebraically.

The above rules are applicable to comparisons of two numbers expressed in conventional binary code. When one or both of the numbers is in a binary code other than conventional, the equivalent matches or mismatches of digits in conventional binary code are to be considered. As an illustration of these rules consider the following examples:

I

| | | | | | | | | | |
|---|---|---|---|---|---|---|---|---|---|
| Weighting | | 64 | 32 | 16 | 8 | 4 | 2 | 1 | |
| Position | | A | B | C | D | E | F | N | |
| 56 | = | 0 | 1 | 1 | 1 | 0 | 0 | 0 | |
| 48 | = | 0 | 1 | 1 | 0 | 0 | 0 | 0 | |
| 8 | = | | | | $+x$ | | | | |
| Weighted output | = | | | | +8 | | | | |

In Example I, the most significant digit mismatch in the conventional binary code form of the compared numbers occurs in position D and is followed by a match in position E, so that in accordance with rule 1, an output is provided with the weighting (8) assigned to the mismatch position D. No mismatch occurs in succeeding digit positions, so that the output having a weighting of 8 constitutes the exact magnitude of the resultant. The mismatch is positive considering the first number (56) as the reference number, so that in accordance with rule 4, the final output is +8.

II

| | | | | | | | | | |
|---|---|---|---|---|---|---|---|---|---|
| Weighting | | 64 | 32 | 16 | 8 | 4 | 2 | 1 | |
| Position | | A | B | C | D | E | F | N | |
| 56 | = | 0 | 1 | 1 | 1 | 0 | 0 | 0 | |
| 12 | = | 0 | 0 | 0 | 1 | 1 | 0 | 0 | |
| 44 | = | | $+x$ | $+x$ | | $-x$ | | | |
| Weighted output | = | | +32 | +16 | | −4 | | | =+44 |

In Example II, the most significant digit mismatch occurs in position B, is positive, and is followed by a positive mismatch in position C, so that in accordance with rule 1, an output is provided with the weighting (32) of position B. In this instance the positive mismatch in position C succeeds a position (B) having a weighting corresponding to an output weighting, and is followed by a match in position D, so that in accordance with rule 3, an output is provided with the weighting (16) of position C. A negative mismatch also occurs in position E. It is the first mismatch succeeding the output weighted in accordance with the weighting assigned position C and is followed by a match in position F, so that, again in accordance with rule 3, an output is provided with the weighting (4) of position E.

The mismatches initiating the outputs in this example are positive in positions B and C and negative in position E considering the first number (56) as the reference number, so that in accordance with rule 4, each of the outputs is given the polarity of the respective mismatch and the final resultant is +32+16−4=+44.

III

| | | | | | | | | | |
|---|---|---|---|---|---|---|---|---|---|
| Weighting | | 64 | 32 | 16 | 8 | 4 | 2 | 1 | |
| Position | | A | B | C | D | E | F | N | |
| 37 | = | 0 | 1 | 0 | 0 | 1 | 0 | 1 | |
| 31 | = | 0 | 0 | 1 | 1 | 1 | 1 | 1 | |
| +6 | = | | + | | $x$ | | $-x$ | | |
| Weighted output | = | | | | +8 | | −2 | | =+6 |

In Example III, note that the most significant digit mismatch (position B) is positive and is followed in positions C and D by negative mismatches. This situation is governed by rule 2 and requires that position B establish the polarity of an output but that position D establish the weighting imparted to the output; i.e., a weighting of 8. A negative mismatch in position F provides a negative output in accordance with rules 3 and 4 with the corresponding weighting of 2. The final output is thus +8−2=+6.

It is a feature of this invention that signals representing corresponding digits of two binary code numbers to be compared be applied to respective ones of a plurality of logic circuits and an output signal equal to their difference magnitude be derived from algebraic addition of output signals from selected ones of said logic circuits.

It is a more specific feature of this invention that digit comparisons be conducted in distinct logic circuits beginning with the logic circuit comparing the most significant digits of the input binary numbers, each circuit being arranged to provide an output signal on one of two output leads, dependent upon the particular input digits and comparisons conducted in more significant digit positions, the outputs of said comparison circuits being combined to form a single output signal corresponding to the exact magnitude of the difference between the input numbers.

It is another feature of this invention that a selected one of two possible signals indicative of the larger of the two binary numbers be derived from a selected one of said logic comparison circuits.

A complete understanding of this invention and of these and various other features thereof may be gained from consideration of the following detailed description and the accompanying drawing, in which.

Figure 1:
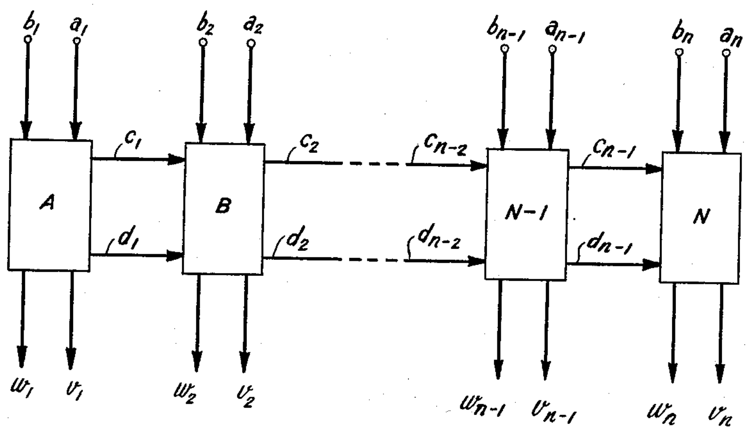
Fig. 1 is a diagrammatic representation in block form of the generalized circuit of the illustrative embodiments of this invention.

Referring now to the drawing, Fig. 1 depicts the generalized form taken by the various illustrative embodiments of this invention. An arrangement of logic circuit comparison positions is utilized to compare the binary code number $a_1a_2a_{n-1}a_n$ with the binary code number $b_1b_2b_{n-1}b_n$. Corresponding digits of each number are applied to a distinct logic circuit position for comparison; thus, $a_1$ and $b_1$, the most significant digits in the binary numbers, are each applied to position A.

Each digit is applied as a selected one of two discrete voltage levels on the corresponding input leads. The two discrete input voltage levels represent the binary digits "one" and "zero," and the explanation hereinafter will allude to the condition of the circuit in terms of the presence of a "one" or a "zero."

The comparison conducted in position A may yield an indication of a positive mismatch in the digits compared and may signal this condition on lead $c_1$ to position B, comparing the next most significant digits. Position A also may yield an indication of a negative mismatch on lead $d_1$ or may provide an indication of a match by failure to supply a signal on either of leads $c_1$ and $d_1$. Such indications will be described hereinafter as carries. Thus, a positive mismatch produces a positive carry and a negative mismatch a negative carry, which carries are operative on the logic circuit position comparing digits of the next lower order.

The remaining logic circuit positions B . . . $N-1$ and N, conduct similar comparisons of digits of corresponding significance under the influence of carries from more significant digit comparisons. Selected ones of the positions A . . . N will provide output signals on one of the associated $w$ or $v$ leads, respectively, dependent upon the difference in magnitude of the two numbers as determined by comparisons in the individual positions. Likewise, an output of one of the positions indicates the relative magnitude of the two numbers.

The components utilized in each intermediate digit comparison position are identical, so that the four positions shown in Fig. 1 are adequate to disclose a system comparing any multidigit binary numbers. With each additional digit in the input numbers, a position comparable to intermediate positions B and $N-1$ is added.

The generalized circuit of Fig. 1 may be adapted to comparisons of binary numbers in any code form or combination of code forms. The circuit of Fig. 2, for example, compares two conventional binary code numbers. The general principles for comparing numbers in any binary code or combination of codes are the same, however, so that the disclosure is not confined only to the scheme of the illustrative embodiment defined hereinafter as adapted to a particular code.

The logic involved in the binary number comparison conducted in the circuit of Fig. 2 may be expressed in algebraic form, utilizing the terminology of Boolean algebra, as follows:

Positive carry $c_i=c_{i+1}(a_i\oplus b_i)+d'_{i+1}a_ib_i'$
Negative carry $d_i=d_{i+1}(a_i\oplus b_i)+c'_{i+1}a_i'b_i$
Positive output $w_i=c_i(c'_{i-1}+a_{i-1})$
Negative output $v_i=d_i(d'_{i-1}+a'_{i-1})$ Where $a_1$ and $b_1$ designate the digit input signals from the compared conventional binary code numbers applied to any selected comparison position $i$, $c_{i+1}$ and $d_{i+1}$ designate positive and negative carries respectively from the next more significant digit position, and $c_{i-1}$ and $d_{i-1}$ designate positive and negative carries respectively from the next lesser significant digit position.

Figure 2:
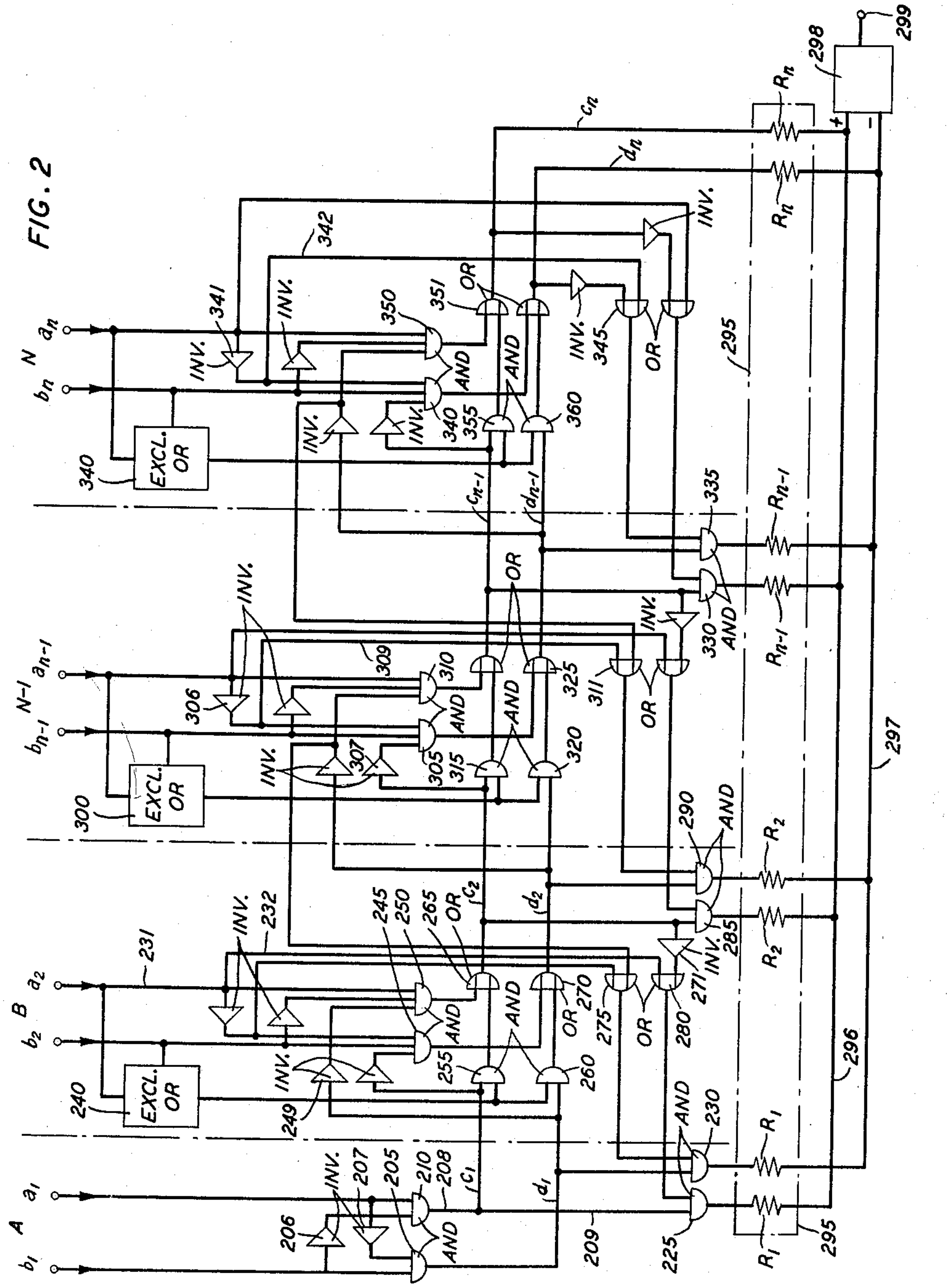
Fig. 2 is a diagrammatic representation of one specific illustrative embodiment of this invention.

Referring now to the circuit of Fig. 2, corresponding digits of each number are applied to logic positions A through N in order of decreasing significance. Each position must compare the applied digit signals and interpret the comparison with reference to more significant digit comparisons. Each of the positions A through N comprises comparison, carry, and output portions. The comparison portion of each position comprises an exclusive OR circuit, two AND circuits, and a series of inverters. The carry portion of each position other than position A comprises two AND circuits and two OR circuits, and the output portion of each position other than positions A and N comprises four AND circuits and an inverter.

Figure 3A:
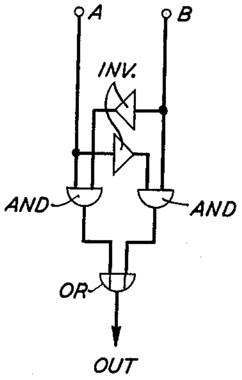
Fig. 3 illustrates simple schematic representations of various logic components which may be employed in the embodiment of Fig. 2.

The exclusive OR circuit components and operation are described in detail in my application Serial No. 581,175, filed April 27, 1956. An equivalent circuit utilizing AND and OR logic circuits which may be employed herein, is shown in Fig. 3a. The function of the exclusive OR circuit is to convert a signal received at one input thereto provided that a "one" signal is received simultaneously at a second input thereto. Thus, in Fig. 3a, if the signal at A is a "one" and the control signal at input B is a "one," the output will be the inverse of the signal at input A, or a "zero." If one of the signals is a "zero" the output will be a "one." If both inputs are "zero" the output will be a "zero."

Figure 3B:
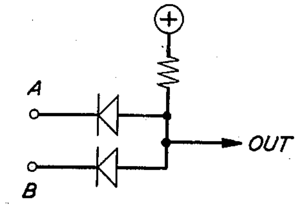
Figure 3D:
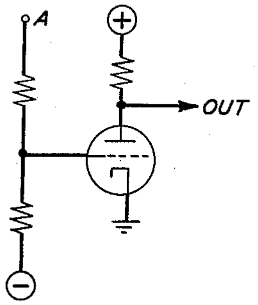
Figure 3C:
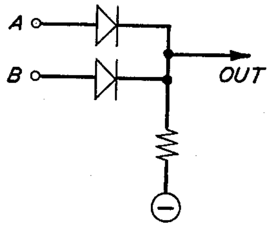

Figs. 3b, 3c and 3d, respectively, illustrate typical AND and OR circuits utilizing diodes and an inverter circuit utilizing a triode. The balance of the logic components of the circuits shown in Fig. 2 may take these or comparable forms as required.

Each of the AND circuits is arranged to provide an output "one" only if "one" signals are presented simultaneously at all of the inputs thereto. Each OR circuit provides a "one" output signal if a "one" signal is present at at least one of the inputs thereto. Each inverter provides an output "one" or "zero" signal equivalent to the inverse of the input "one" or "zero" signal applied thereto.

A comparison of two distinct sets of input numbers will serve to demonstrate the operation of the circuit of Fig. 2. Assume, first, that the number 12 is to be compared with the number 6, the former being the reference number. Table IV illustrates the elements of the problem:

IV

| | | | | | | | |
|---|---|---|---|---|---|---|---|
| | Weighting | | 8 | 4 | 2 | 1 | |
| | Position | | A | B | N−1 | N | |
| 12 | $a_1a_2a_{n-1}a_n$ | = | 1 | 1 | 0 | 0 | |
| 6 | $b_1b_2b_{n-1}b_n$ | = | 0 | 1 | 1 | 0 | |
| +6 | | | +x | | −x | | |
| | Weighted result | = | +8 | | −2 | | =+6 |

The correct resultant is positive 6. Thus, the circuit of Fig. 2 must provide a positive relative magnitude output signal and a difference magnitude output signal having a binary weight corresponding exactly to the resultant 6. Note that the compared numbers in conventional binary form reveal a positive mismatch in position A, the most significant digit position; i.e., $a_1=1$ and $b_1=0$. Comparison of the conventional binary code digits in position B reveals a match, so that in accordance with rule 1, stated hereinbefore, the circuit should provide a positive output having a binary weighting equivalent to that of position A. Note also that a negative mismatch exists in position $N-1$; i.e., $a_1=0$ and $b_1=1$. This negative mismatch is followed by a match in position N, so that in accordance with rule 3, stated hereinbefore, the circuit also provides a negative output having a binary weighting equivalent to that of position N−1. Finally, in accordance with rule 4, the two outputs are added algebraically to provide the final exact magnitude resultant of +6.

The circuit of Fig. 2 conducts the comparison of the numbers 12 and 6 in conventional binary code form and provides the exact resultant of +6 in the manner described hereinafter.

Position A receives a "one" and a "zero" on the respective $a_1$ and $b_1$ input leads, so that comparison AND circuit 210 receives a "one" from input $a_1$ and a "one" from input $b_1$ through inverter 206. Similarly, comparison AND circuit 205 receives a "zero" from input $b_1$ and a "zero" from input $a_1$ through inverter 207. Thus, only comparison AND circuit 210 delivers an output "one" signal. The "one" signal is transmitted over lead 208 to positive carry lead $c_1$. The signal on carry lead $c_1$ is passed to output AND circuit 225 over lead 209.

Position B receives the next most significant digits $a_2$ and $b_2$ of the two input numbers. In this example a "one" will appear on both of these leads. Exclusive OR circuit 240 receives a "one" input from $a_2$ and also from $b_2$ and proceeds to invert the input digit $a_2$ from a "one" to a "zero" in its output, which is connected to carry AND circuits 255 and 260. Thus position B stops the carry begun in position A at carry AND circuits 255 and 260. From the digit $a_2$ input in position B, a "one" signal passes over leads 231 and 232 to OR circuit 280, the other input of which receives a "one" signal from inverter 271 reflecting the presence of a "zero" signal or absence of a "one" signal on positive carry lead $c_2$. The output of OR circuit 280 is delivered to output AND circuit 225 which, in conjunction with the "one" signal from positive carry lead $c_1$, provides an output signal through analog converter 295 to positive output lead 296. The $R_1$ section of analog converter 295 gives this output signal the appropriate analog weighting (8) of position A.

Position $N-1$ receives the digits $a_{n-1}$ and $b_{n-1}$ which in this instance are "zero" and "one" respectively. Exclusive OR circuit 300 receives a "one" input from $b_{n-1}$ and a "zero" input from $a_{n-1}$ and thus proceeds to invert the digit $a_{n-1}$ from a "zero" to a "one" in its output, which is connected to carry AND circuits 315 and 320. Absent "one" signals on the carry leads $c_2$ and $d_2$, carry AND circuits 315 and 320 are not activated.

Comparison AND circuit 305 in position $N-1$ receives the "one" $b_{n-1}$ input, a "one" from inverter 306 in response to the "zero" $a_{n-1}$ signal, and a "one" from inverter 307 in response to the "zero" on carry lead $c_2$. Receipt of "one" signals at each of its inputs activates comparison AND circuit 305 to transmit a "one" signal through carry OR circuit 325 to negative carry lead $d_{n-1}$.

The "one" signal on lead $d_{n-1}$ is received at one input of output AND circuit 335, the other input of which receives a "one" signal from the "zero" $a_n$ input of position N via inverter 341, lead 342 and OR circuit 345. With "ones" at each of its inputs, output AND circuit 335 will provide an output signal to the $R_{n-1}$ section of analog converter 295, which in turn will impart to the output signal the analog weighting (2) assigned to position $N-1$. The weighted output signal from $R_2$ is received by negative output lead 397.

Position N receives "zeros" on each of its $a_n$ and $b_n$ inputs. Exclusive OR circuit 340, receiving "zeros" at each of its inputs, will provide a "zero" output to each of the carry AND circuits 355 and 360, so that position N will not extend carry signals received from position $N-1$.

Comparison AND circuits 340 and 350 in position N receive "zero" inputs $b_n$ and $a_n$ respectively and thus fail to provide output signals to carry leads $c_n$ and $d_n$ and no difference magnitude output is formed in position N.

All of the weighted output signals on positive difference magnitude output lead 396 add to form a single positive output signal. Similarly, all of the weighted output signals received on negative difference magnitude output lead 397 add together to form a single negative output signal. The positive and negative totals are combined algebraically in circuit 298 to indicate the exact difference magnitude between the compared numbers on final output lead 299.

In this example, a signal having a weighting of 8 appears on the positive output lead 396 and a signal having a weighting of 2 appears on the negative output lead 397. These weighted signals may be algebraically added in circuit 298 to form the final exact magnitude output signal +6 on lead 299.

Assume, now, that the number 5 is to be compared with the number 8, the former being the reference number. Table V illustrates the elements of the problem:

V

| | | | | | | | |
|---|---|---|---|---|---|---|---|
| | Weighting | | 8 | 4 | 2 | 1 | |
| | Position | | A | B | N−1 | N | |
| 5 | $a_1a_2a_{n-1}a_n$ | = | 0 | 1 | 0 | 1 | |
| 8 | $b_1b_2b_{n-1}b_n$ | = | 1 | 0 | 0 | 0 | |
| −3 | | | − | $x$ | | $+x$ | |
| | Weighted result | = | | −4 | | +1 | =−3 |

The correct resultant is negative 3. Thus, the circuit of Fig. 2, given the two numbers in parallel conventional binary code form, must provide a negative relative magnitude output signal and a difference magnitude output signal having a binary weight corresponding exactly to the resultant 3. Note that the compared numbers in conventional binary form reveal a negative mismatch in position A, the most significant digit position; i.e., $a_1=0$ and $b_1=1$. Comparison of the conventional binary code digits in position B reveals a positive mismatch or the inverse mismatch of that appearing in position A. The digits match in position $N-1$, so that in accordance with rule 2, stated hereinbefore, the circuit should provide a negative output having a binary weighting equivalent to that of position B. Note also that a positive mismatch exists in position N, so that in accordance with rule 3, stated hereinbefore, the circuit also provides a positive output having a binary weighting equivalent to that of position N. Finally, in accordance with rule 4, the two outputs are added algebraically to provide the final exact magnitude resultant of −3.

The circuit of Fig. 2 conducts the comparison of the numbers 5 and 8 in conventional binary code form and provides the exact resultant of −3 in the manner described hereinafter.

Position A receives a "zero" and a "one" on the respective $a_1$ and $b_1$ input leads, so that comparison AND circuit 205 receives a "one" from input $b_1$ and a "one" from inverter 207, responsive to the "zero" on input $a_1$. Thus comparison AND circuit 205 delivers an output "one" signal to negative carry lead $d_1$.

Position B receives the next most significant digits $a_2$ and $b_2$ of the two input numbers. In this example, a "one" appears on $a_2$ and a "zero" appears on $b_2$. Exclusive OR circuit 240 receives the "one" input from $a_2$ in conjunction with the "zero" input from $b_2$ and therefore provides a "one" output signal to carry AND circuits 255 and 260. Carry AND circuit 260 receives the "one" on negative carry lead $d_1$ at its other input and thus is activated to provide a "one" output signal through carry OR circuit 270 to negative carry lead $d_2$.

Comparison AND circuit 245 in position B receives a "zero" from input $b_2$ and fails to provide an output. Similarly, comparison AND circuit 250 in position B receives a "zero" from inverter 249 responsive to the "one" signal on negative carry lead $d_1$ and fails to provide an output.

Output AND circuits 225 and 230 in position A each receive at least one "zero" input and thus fail to provide a relative magnitude output signal having the weighting of position A. Comparison AND circuit 290 in position B receives a "one" from negative carry lead $d_2$ on one input thereof and a "one" signal on its other input from the "zero" $a_{n-1}$ input in position $N-1$ via inverter 306, lead 309 and OR circuit 311. Output AND circuit 290 thus is activated to provide a "one" output signal to negative output lead 297. The $R_2$ section of analog converter 295 imparts the position B weighting (4) to this output signal.

Position $N-1$ receives "zero" signals at each of its inputs $a_{n-1}$ and $b_{n-1}$. Exclusive OR circuit 300, receiving two "zero" inputs, provides a "zero" output to carry AND circuits 315 and 320. Position $N-1$ thus stops the carry begun in position A at carry AND circuits 315 and 320.

Each of the comparison AND circuits 305 and 310 in position $N-1$ receives a "zero" from the input digits $a_{n-1}$ and $b_{n-1}$ and fails to provide carry signals to position N. Similarly, output AND circuits 330 and 335 fail to receive "one" signals on their input leads from the carry leads $c_{n-1}$ and $d_{n-1}$ and thus fail to provide difference magnitude output signals in position $N-1$.

Position N receives a "one" on $a_n$ and a "zero" on $b_n$. Exclusive OR circuit 340, receiving a "zero" $b_n$ input passes the "one" from $a_n$, at its other input, to carry AND circuits 355 and 360. However, AND circuits 355 and 360 fail to receive "ones" from the carry leads $c_{n-1}$ and $d_{n-1}$ respectively and are not activated.

Comparison AND circuit 350 receives a "one" at each of its inputs and provides a "one" to positive carry lead $c_n$ through carry OR circuit 351. Lead $c_n$ in this instance serves as the output lead from position N and passes the "one" signal to positive output lead 296 through the $R_n$ section of analog converter 295. The $R_n$ section imparts to the output signal the analog weighting (1) assigned to position N.

The posiitve output lead 296 thus carries an output signal with a weighting of 1 and the negative output lead 297 carries an output signal with a weighting of 4. These signals may be added algebraically in circuit 298 to provide the final exact difference magnitude output signal of $-3$ on lead 299.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for comparing two binary numbers comprising a plurality of distinct comparison circuits each corresponding to a distinct digit position in the binary numbers for detecting various combinations of digits applied thereto, said combinations being equivalent to matches and mismatches of said digits in conventional binary code form, means for applying digits of like significance in said binary numbers to individual of said comparison circuits, output means corresponding to each of said comparison circuits, means responsive to detection of a first combination of said digits by first ones of comparison circuits to enable the output means corresponding to said first comparison circuits, means responsive to detection of a second combination of said digits by each of a series of comparison circuits following one of said first comparison circuits in order of decreasing significance to enable the output means corresponding to each of said series of comparison circuits, and means responsive to detection of said first combination or a third combination of said digits by a less significant digit comparison circuit following one of said first comparison circuits to actuate the enabled output means corresponding to the comparison circuit in the digit position preceding said less significant digit comparison circuit, whereby output signals are provided by said output means collectively indicative of the exact magnitude of the difference between said two binary numbers being compared.

2. An electrical circuit for comparing two binary numbers comprising a plurality of distinct comparison circuits each corresponding to a distinct digit position in the binary numbers for detecting first, second and third combinations of digits applied thereto, said combinations being equivalent respectively to a mismatch in one direction, a mismatch in the opposite direction and a match of the digits in conventional binary code form, means for applying digits of like significance in said binary numbers to individual of said comparison circuits, output means corresponding to each of said comparison circuits, means responsive to detection of said first combination of said digits by first ones of said comparison circuits to enable the output means corresponding to said first comparison circuits, means responsive to detection of said second combination of said digits by each of a series of comparison circuits following one of said first comparison circuits in order of decreasing significance to enable the output means corresponding to each of said series of comparison circuits, and means responsive to detection of said first combination or said third combination of said digits by a less significant digit comparison circuit following one of said first comparison circuits to actuate the enabled output means corresponding to the comparison circuit in the digit position preceding said less significant digit comparison circuit, whereby output signals are provded by said output means collectively indicative of the exact magnitude of the difference between said two binary numbers being compared.

3. An electrical circuit in accordance with claim 2 and further comprising distinct weighting means connected to individual of said output means, said weighting means imparting a distinct weighting to said output signals related in significance to the corresponding digit positions of said binary numbers being compared.

4. An electrical circuit in accordance with claim 3 and further comprising an output terminal connected to said weighting means and means algebraically adding said weighted output signals and applying the resultant to said output terminal indicative of the sign and exact magnitude of the difference between said numbers.

5. An electrical circuit for comparing two binary numbers comprising a plurality of distinct comparison circuits, means for applying digits of like significance in said binary numbers to individual of said comparison circuits, distinct output means for each digit position in the binary numbers, first means connected from each comparison circuit to individual of said output means and to the next lesser significant digit comparison circuit, second means connected from said comparison circuit in each position to said output means for a more signficant digit position, means in said comparison circuits for detecting input digit combinations equivalent to a mismatch in one direction, a mismatch in the opposite direction or a match of the digits in conventional binary code form respectively, means in said comparison circuits responsive to detection of a first input digit combination to apply signals to said first connecting means, means responsive to detection of a second input digit combination by less significant digit comparison circuits to apply signals to said first connecting means, and means responsive to detection of said first or a third input digit combination by said less significant digit comparison circuits to apply signals to said second connecting means, individual of said output means responsive to receipt of signals concurrently over said first and second connecting means to provide output signals collectively indicative of the exact magnitude of the difference between said binary numbers being compared.

6. An electrical circuit for comparing two binary numbers comprising a distinct comparison circuit for each digit position in the binary numbers, means for applying digits of like significance in said binary numbers to a corresponding digit comparison circuit, distinct output indicating means for each digit position in the binary numbers, means for applying first signals from each comparison circuit to individual of said output indicating means and to a lesser significant digit comparison circuit, and means for applying second signals from said comparison circuit for one digit position to said output means for a more significant digit position, said output indicating means each responsive to receipt of a first signal and a second signal to provide output signals collectively indicative of the exact magnitude of the difference between said binary numbers being compared.

7. An electrical circuit for comparing two binary numbers comprising a distinct comparison circuit for each digit position in the binary numbers, means for applying digits of like significance in said binary numbers to a corresponding digit comparison circuit, distinct output indicating means for each digit position in the binary numbers, first means connected from each comparison circuit to individual of said output means and to the next lesser significant digit comparison circuit, second means connected from said comparison circuit in each position to said output indicating means for a more significant digit position, and means in said comparison circuits for applying signals to said first and second connecting means responsive to certain input digit combinations, said output indicating means responsive to signals received through said first and second connecting means to provide output signals collectively indicative of the exact magnitude of the difference between said binary numbers being compared.

8. An electrical circuit for comparing two binary numbers comprising a plurality of distinct comparison circuits, means for applying digits of like significance in said binary numbers to individual of said comparison circuits, a plurality of distinct output means each corresponding to a distinct digit position of said binary numbers, first means connecting each of said comparison circuits to individual of said output means and to the next less significant digit of comparison circuit, and second means connecting each of said comparison circuits to said output means corresponding to the next more significant digit position of said binary numbers, said comparison means responsive to certain input digit combinations to apply signals to said first and second connecting means, said output means responsive to concurrent receipt of certain combinations of signals over said first and second connecting means to provide output signals.

9. An electrical circuit in accordance with claim 8 and further comprising distinct weighting means connected to individual of said output means, said weighting means imparting a distinct weighting to said output signals related in significance to the corresponding digit positions of said binary numbers being compared.

10. An electrical circuit in accordance with claim 9 and further comprising an output terminal connected to said weighting means and means algebraically adding said weighted output signals and applying the resultant to said output terminal indicative of the sign and exact magnitude of the difference between said numbers.

11. An electrical circuit in accordance with claim 8 wherein said first connecting means comprise first and second signal paths and said second connecting means comprise third and fourth signal paths, said distinct output means being enabled by concurrent receipt of signals on said first and third signal paths or said second and fourth signal paths.

12. An electrical circuit in accordance with claim 11 wherein said distinct output means comprise first and second coincidence logic circuits, said first coincidence logic circuit being connected to first and third signal paths and said second coincidence logic circuit being connected to second and fourth signal paths.

13. An electrical circuit in accordance with claim 11 wherein said distinct comparison circuits comprise first and second coincidence logic circuits connected to said first and second signal paths respectively, each of said comparison circuit coincidence logic circuits being arranged to receive representations of the like significance input digits and responsive to certain combinations of said input digit representations to apply a signal to the associated signal path.

14. An electrical circuit in accordance with claim 11 wherein said distinct comparison circuits comprise first and second logical OR circuits connected to said third and fourth signal paths respectively, said first logical OR circuit being arranged to receive the inverse of signals on said first signal path and one of the input digits applied to the distinct comparison circuit, said second logical OR circuit being arranged to receive the inverse of signals on said second signal path and the inverse of said one of the input digits applied to the distinct comparison circuit.

15. An electrical circuit for comparing two binary numbers comprising a plurality of distinct comparison circuits, means for applying digits of like significance in said binary numbers to individual of said comparison circuits, a plurality of distinct output means each corresponding to a distinct digit position of said binary numbers, first means connecting each of said comparison circuits to individual of said output means and to a lesser significant digit comparison circuit, and second means connecting each of said comparison means and the corresponding digit applying means to said output means corresponding to a more significant digit position of said binary numbers, said comparison means responsive to certain input digit combinations to apply signals to said first and second connecting means, said output means responsive to receipt of certain combinations of signals over said first and second connecting means to provide output signals collectively indicative of the exact magnitude of the difference between said binary numbers being compared.

16. An electrical circuit for comparing two binary numbers comprising a distinct comparison circuit including carry means for each digit position in the binary numbers, means for applying digits of like significance in said binary numbers to the comparison circuit for the corresponding digit position, distinct output indicating means for each digit position in the binary numbers, first means for applying signals from each comparison circuit to individual of said output indicating means and to the carry means in a lesser significant digit position, second means for applying signals from said comparison circuit for one position to said output means for a more significant digit position, and means in said comparison circuits for applying signals to said carry means and said first and second connecting means responsive to certain input digit combinations, said output indicating means responsive to signals received through said first and second connecting means to provide output signals collectively indicative of the exact magnitude of the difference between said binary numbers being compared.

17. An electrical circuit in accordance with claim 16 wherein said first connecting means comprise first and second signal paths and said second connecting means comprise third and fourth signal paths, said distinct output indicating means being enabled by concurrent receipt of signals on said first and third signal paths or said second and fourth signal paths.

18. An electrical circuit in accordance with claim 17 wherein said carry means comprises first and second coincidence logic circuits, said first carry means coincidence logic circuit being connected to said first signal path and the corresponding comparison circuit, and said second carry means coincidence logic circuit being connected to said second signal path and said corresponding comparison circuit.

19. An electrical circuit in accordance with claim 16 and further comprising distinct weighting means connected to individual of said output indicating means, said weighting means imparting a distinct weighting to said output signals related in significance to the corresponding digit positions of said binary numbers being compared.

20. An electrical circuit in accordance with claim 19 wherein said distinct weighting means comprises analog conversion means, an output terminal connected to said analog conversion means, and means algebraically adding said analog weighted output signals and applying the resultant to said output terminal indicative of the sign and the exact magnitude of the difference between said binary numbers being compared.

21. An electrical circuit for comparing two binary numbers comprising a distinct comparison circuit for each digit position in the binary numbers, means for applying digits of like significance in said binary numbers to the comparison circuit for the corresponding digit position, distinct output indicating means for each digit position in the binary numbers, carry means in each digit position, first means for applying signals from each comparison circuit to individual of said output indicating means and to the carry means in the next less significant digit position, second means for applying signals from said comparison circuit and carry means in one position to said output means for the next more significant digit position, and means in said comparison circuits for applying signals to said carry means and said first and second connecting means responsive to certain input digit combinations, said output indicating means responsive to signals received through said first and second connecting means to provide output signals collectively indicative of the relative magnitude and exact magnitude of the difference between said binary numbers being compared.

22. An electrical circuit for comparing two binary numbers comprising a distinct comparison circuit for each digit position in the binary numbers, means for applying digits of like significance in said binary numbers to the comparison circuit for the corresponding digit position, distinct output indicating means for each digit position in the binary numbers, carry means in each digit position connected to the comparison circuit in the same position and to the carry means in the next less significant digit position, first means connected from each comparison circuit to individual of said output indicating means and to the carry means in the next less significant digit position, second means connected from said comparison circuit, corresponding digit applying means, and carry means in each position to said output indicating means for a more significant digit position, and means in said comparison circuits for applying signals to said carry means and said first and second connecting means responsive to certain input digit combinations, said output indicating means responsive to signals received through said first and second connecting means to provide output signals collectively indicative of the sign and exact magnitude of the difference between said binary numbers being compared.

References Cited in the file of this patent

UNITED STATES PATENTS

| | | |
|---|---|---|
| 2,318,591 | Conffignal | May 11, 1943 |
| 2,364,540 | Luhn | Dec. 5, 1944 |
| 2,749,440 | Cartwright | June 5, 1956 |
| 2,803,401 | Nelson | Aug. 20, 1957 |

FOREIGN PATENTS

| | | |
|---|---|---|
| 1,005,754 | France | Jan. 2, 1952 |

OTHER REFERENCES

De Turb et al.: Basic Circuitry of the Midac and Midsac, University of Michigan Engineering Research Institute (Ypsilanti, Michigan), May 1954 (pps. II-10 and II-11).